United States Patent [19]

Andersson et al.

[11] Patent Number: 4,831,232
[45] Date of Patent: May 16, 1989

[54] INDUSTRIAL ROBOT EQUIPMENT CAPABLE OF AUTOMATICALLY TERMINATING OPERATION AT A DESIRED SENSED LOCATION

[75] Inventors: Björn Andersson; Mats Björkelund, both of Västerås; Stefan Edström, Enköping; Jan Fäger; Monica Schofield, both of Västerås, all of Sweden

[73] Assignee: ASEA Aktiebolag, Västerås, Sweden

[21] Appl. No.: 98,177

[22] Filed: Sep. 16, 1987

[30] Foreign Application Priority Data

Sep. 29, 1986 [SE] Sweden ................................ 8604100

[51] Int. Cl.⁴ .............................................. B23K 9/12
[52] U.S. Cl. .............................. 219/124.34; 318/577; 901/42
[58] Field of Search ................ 219/124.34; 901/9, 42; 318/577

[56] References Cited

U.S. PATENT DOCUMENTS

| | | | |
|---|---|---|---|
| 3,860,862 | 1/1975 | Dell et al. | 318/568 |
| 4,220,903 | 9/1980 | Schumann | 318/577 |
| 4,623,778 | 11/1986 | Cullen et al. | 219/124.34 |
| 4,675,502 | 6/1987 | Haefner et al. | 901/42 |

FOREIGN PATENT DOCUMENTS 61-37377  2/1986  Japan .............................. 219/124.34

*Primary Examiner*—Clifford C. Shaw
*Attorney, Agent, or Firm*—Pollock, Vande Sande & Priddy

[57] ABSTRACT

An industrial robot supports an operating member mounted on the robot hand for carrying out work or monitoring operation on an object. The robot has a sensor which controls the path of movement of the robot hand during the operation. The robot is provided with means which during the work operation investigates whether a quantity, sensed with the aid of the sensor, for example a sudden change in the direction of the path, fulfills a predetermined criterion and, in dependence thereon, interrupts the movement of the robot hand if the criterion is fulfilled.

2 Claims, 11 Drawing Sheets

FIG. 6A
FIG. 6B
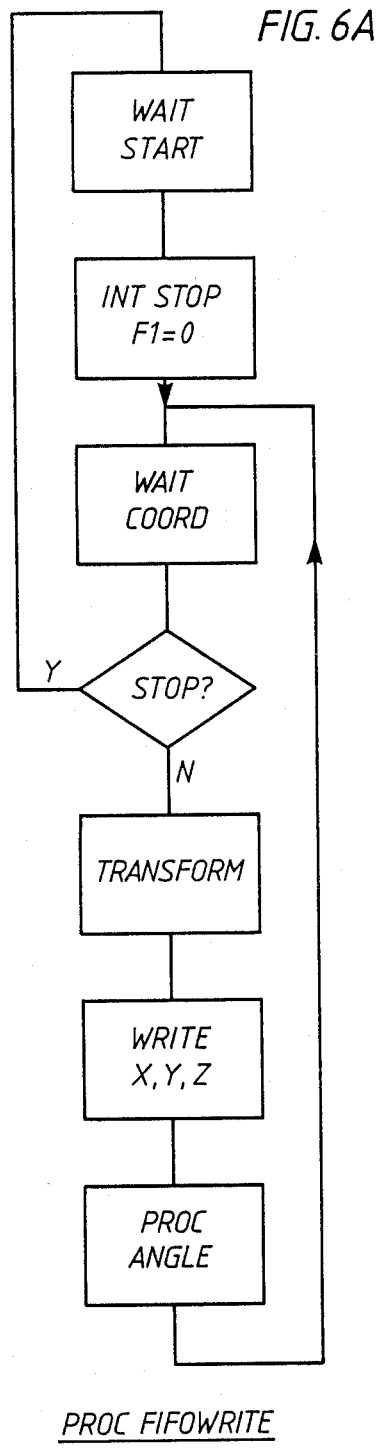
PROC FIFOWRITE
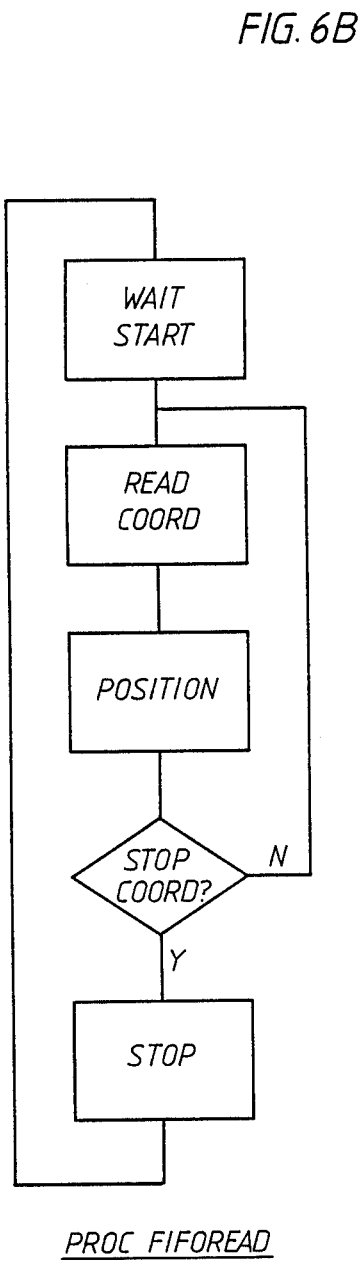
PROC FIFOREAD

PROC ANGLE

INDUSTRIAL ROBOT EQUIPMENT CAPABLE OF AUTOMATICALLY TERMINATING OPERATION AT A DESIRED SENSED LOCATION

TECHNICAL FIELD

The present invention relates to industrial robot equipment comprising an industrial robot with a robot hand on which an operating member (e.g. a work tool) is mounted for carrying out a required operation on an object. In addition, the robot is provided with a sensor for controlling the operating member along a path along the object while carrying out the operation.

BACKGROUND ART

It is previously know to use industrial robots for carrying out automatic welding along a weld joint and to use in that connection a sensor mounted adjacent to the welding tool supported by the robot hand to cause the welding tool to trace along the weld joint. The welding can therefore be carried out automatically in a satisfactory manner, to a smaller or greater extent independently of variations between the weld pieces in terms of the extension of the weld joint.

Equipment of this kind is previously known, for example from U.S. patent application Ser. No. 597,298 (filed on Apr. 6, 1984 in the names of Edling et al) and from U.S. Pat. Nos. 4,417,127 and 4,501,950.

Equipment of the above-mentioned kind can be employed also for other types of work operations than welding, such as, e.g. for spreading glue or laying out strings of a sealing compound.

In equipment of the above-mentioned kind, the robot can be programmed to track a pre-programmed path, the sensor giving the necessary corrections to the pre-programmed path. According to another alternative, the sensor and the control system of the robot can be designed in such a way that no pre-programming of a path is necessary at all. In connection with welding, for example, the sensor moves along the weld joint a certain distance ahead of the welding tool and continuously determines the position of the weld joint. The welding tool is controlled to track the path determined by the sensor. In the latter alternative, the necessary programming work is greatly reduced. In principle, the robot need only be positioned with the welding tool at the initial point of the weld joint and in such a way that the weld joint is located within the measuring range of the sensor, whereafter the welding procedure can be started.

It should be noted that the path which is tracked by the robot hand (the tool) is not necessarily a defined path, but the expression "path" relates to the curve that describes the course of the robot hand during the required operation. It may have any arbitrary shape and orientation, and in each particular case it is determined by the work object via the sensor.

In equipment of the kind described above, it has so far been impossible to obtain, in a simple manner, an interruption of the required operation at precisely the desired point on the workpiece. Owing to unavoidable variations as to position, orientation and dimensions between the individual workpieces the position of the desired end point may vary considerably relative to the object. Hitherto, therefore, it has normally been necessary, at each individual workpiece and prior to the work-operation, to first manually move the robot to the end point of the working path and store the coordinates of this point. Thereafter, the robot is manually moved to the initial point of the working path, whereupon the working procedure is started. The robot has thus become programmed in such a way that it stop and interrupts the work operation when a certain predetermined distance has been covered. This method is time-consuming and requires a relatively extensive operator effort.

The invention aims to provide industrial equipment of the kind mentioned in the introduction, in which the operator's work is reduced to a minimum by eliminating the need to program the end point of the work operation for each individual workpiece.

From U.S. Pat. Nos. 3,860,862 and 4,220,903 equipment is known in which photoelectric detectors are provided for automatic tracking of a line on, for example, a drawing. On the basis of signals from the detector, a work tool, for example a gas cutting torch, is controlled along a desired path on a workpiece. By providing the drawn line to be tracked with cross strokes, interruptions, or portions with a deviating line width, it is possible to initiate, for example, the start/stop of a work operation, or a change of the velocity of movement by way of the detector. These two publications do not deal with the above-mentioned special problems which arise in connection with an industrial robot which, with the aid of a detector, mounted together with an operating member on the robot hand is to track a path determined by the work object itself, for example a seam to be welded.

U.S. Pat. No. 4,623,778 describes an automatic welding machine in which a photoelectric detector is arranged to cause the welding tool to track a seam of a workpiece. If the detector loses the seam, the operation is interrupted after a predetermined time. However, no method is suggested for causing an operation carried out by an industrial robot to be terminated at a desired point on a workpiece, independently of variations in position, orientation and dimensions between individual workpieces.

SUMMARY OF THE INVENTION

What characterizes industrial robot equipment according to the invention will become clear from the appended claims.

According to the invention, the sensor already present in the equipment for tracking a path is employed also for determining the end point of the path. Thus according to the invention, an important additional function can be obtained without increasing the degree of complexity of the equipment. With the aid of equipment according to the invention there is further obtained a considerable reduction of the necessary operator work with programming and supervision. If the equipment is supplemented with a method, known per se, for detecting the starting point of the working path (see e.g. the above-mentioned U.S. patent application Ser. No. 597,298) it is even possible to obtain a fully automatic operation also in the case of large variations in the position, orientation, and dimensions of the workpieces.

BRIEF DESCRIPTION OF THE DRAWINGS

An embodiment of industrial robot equipment according to the invention will be described, by way of example, in greater detail below with reference to the accompanying drawings, wherein FIG. 1 schematically shows equipment according to the embodiment, FIGS. 6A–6C show, in the form of flow charts, the function of the control equipment of the robot in the embodiment according to FIGS. 5A–5C, FIG. 7 schematically shows how the sensor unit can be designated to provide a measure of variations in the reflectivity of the surface of the workpiece.

DESCRIPTION OF THE PREFERRED EMBODIMENT

Figure 1:
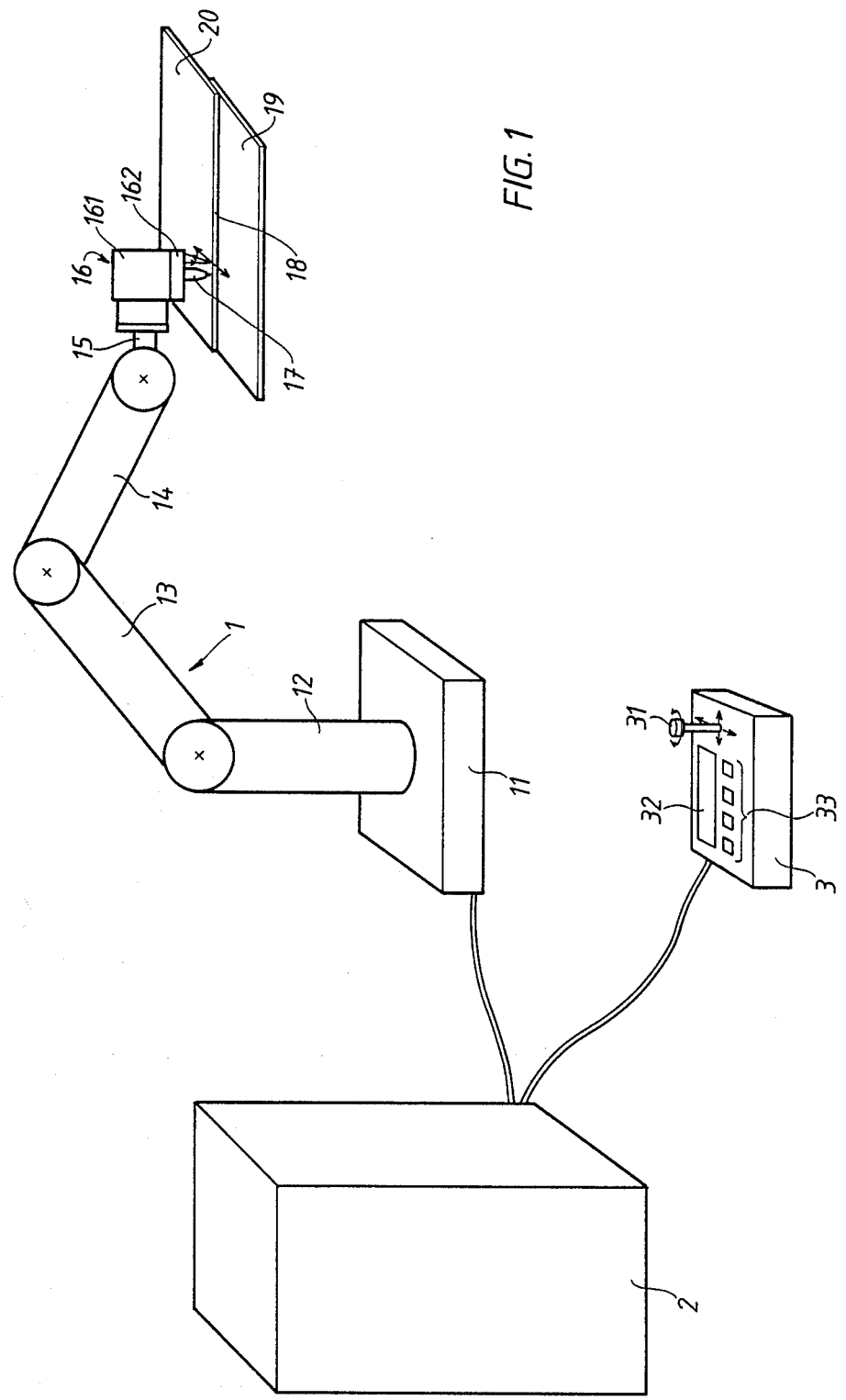

FIG. 1 shows industrial robot equipment for carrying out an electric arc welding operation. The robot equipment may, for example, be of the known type described in ASEA's pamphlets CK 09-1102E and CK 09-1104E. The mechanical part 1 of the robot consists of a base plate 11 fixed to the floor. This plate 11 supports a column 12 which is rotatable around a vertical axis. A lower arm 13 is turnable about a horizontal axis through the upper part of the column 12. An upper arm 14 is turnable about a horizontal axis through the outer part of the lower arm 13. A hand 15 is turnable about a horizontal axis through the outer part of the upper arm 14. In addition, the hand 15 is generally designed so as to have one or two additional degrees of freedom, but for simplicity these have been omitted. The robot hand 15 supports a sensor 16 and a welding torch 17 for electric arc welding. The construction and mode of operation of the sensor 16 will be described in greater detail below with reference to FIG. 3. The sensor 16 operates with optical triangulation and determines the distance to a workpiece 19, 20 as well as the relative lateral position between the sensor 16 and the welding torch 17 on the one hand and a weld joint 18 on the other hand.

Figure 2:
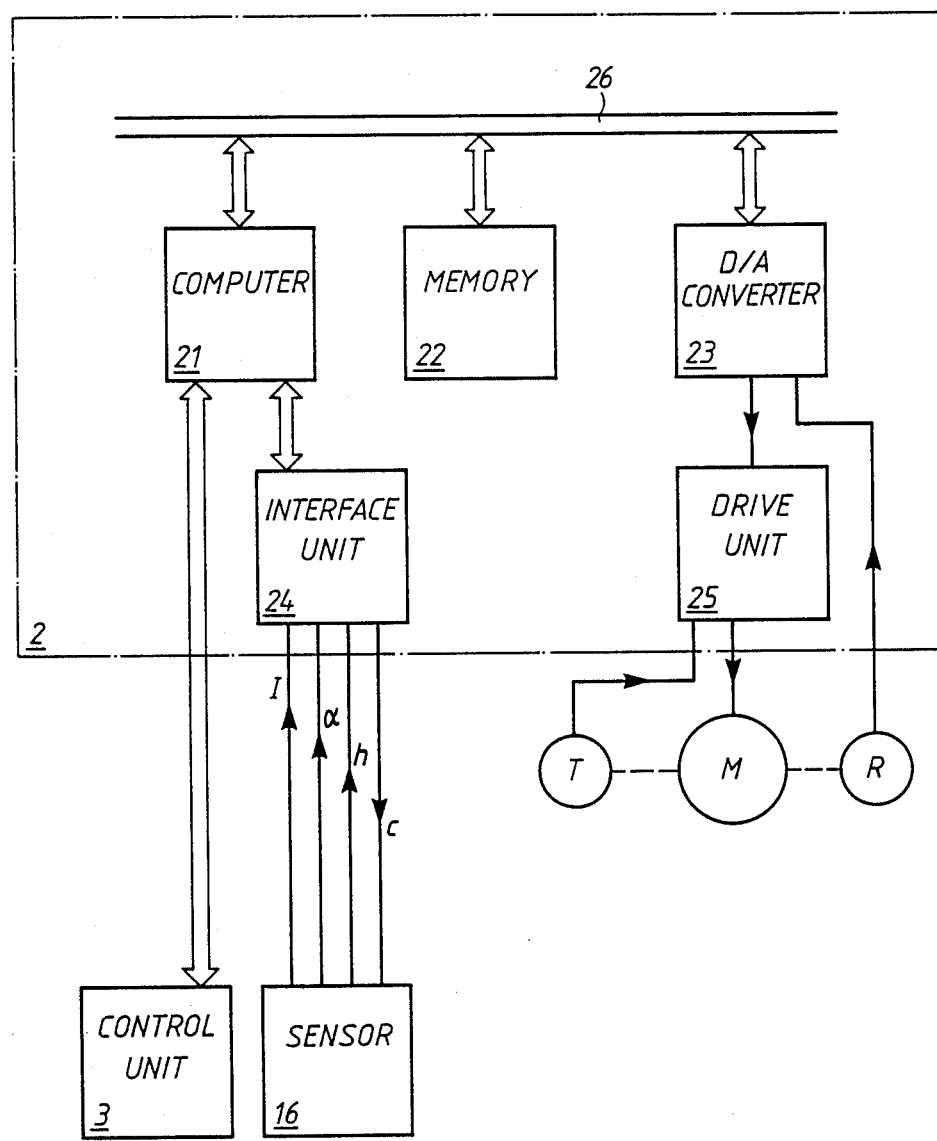
FIG. 2 shows a block diagram of the control and drive units included in the equipment as well as of their interconnection.

Furthermore, the equipment comprises a control cabinet 2 which includes conventional supply, controlling and driving means for controlling the robot. A block diagram of the equipment included in the control cabinet 2 is shown in FIG. 2. An operating unit 3, preferably portable, is connected to the control cabinet 2 and comprises a joystick 31 for controlling the movement of the robot during a programming phase, a presentation member 32, and operating pushbuttons 33 for entering data and commands during the programming phase.

FIG. 2 shows, in the form of a block diagram, the main units in the control cabinet 2 and their connections to other parts of the equipment. The control cabinet 2 comprises a databus 26 to which are connected a computer 21, a memory 22 and a D/A converter 23. The computer 21, which may be divided into several computers, executes the necessary calculations and logical decisions needed for programming and operation of the robot. The computer 21 is connected via a digital channel to the control unit 3 and exchanges operating and information signals with this unit. During the programming of the robot, there are stored in the memory 22 the coordinates for a number of points which determine the desired path of the robot hand, expressed in the robot coordinate system. In connection with these points, there can also be stored instructions, functions and commands which are to be executed at the indicated points. The D/A converter 23 supplies control signals to a drive unit 25, which in principle is a servo-device for control of the drive motor M belonging to a robot shaft. A tachometer generator T is mechanically connected to the motor M, from which generator T a speed feedback signal is supplied to the drive unit 25. Further, a resolver R is connected to the axis in question and delivers a signal, responsive to the angle of rotation in the axis, to the unit 23. The control cabinet 2 comprises a D/A converter 23 and a drive unit 25 for each one of the axes of the robot, but for simplicity only the equipment belonging to one single axis has been shown in FIG. 2. The sensor 16 is connected by way of an interface unit 24 to the computer 21. The sensor 16 supplies to the interface unit 24 the signals I, α and h and receives from the interface unit 24 the signal c. The significance of these signals will be described in greater detail with reference to FIGS. 3 and 7.

Figure 3A:
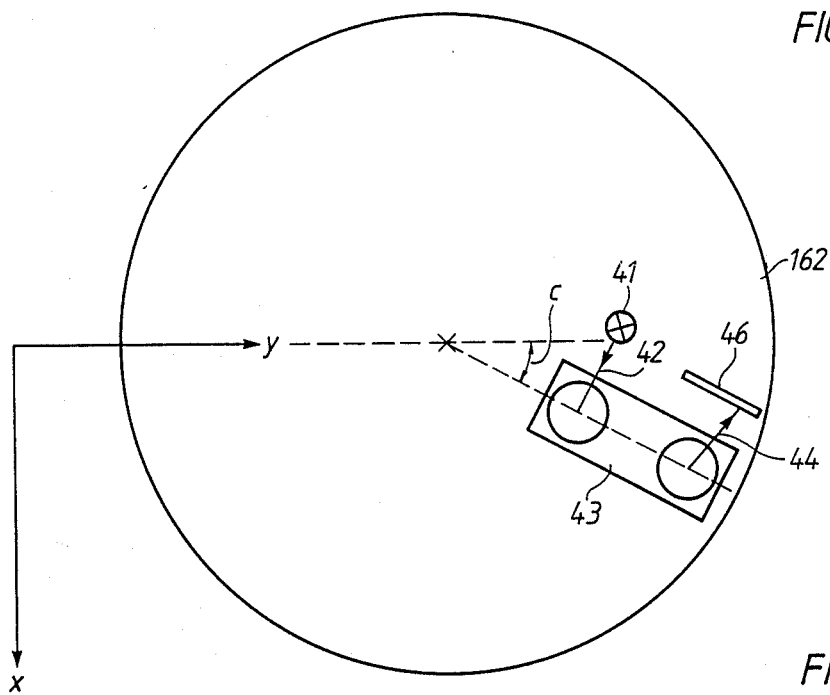
FIGS. 3A–3C show the main components of the sensor of FIG. 1 from three different viewing angles.
Figure 3B:
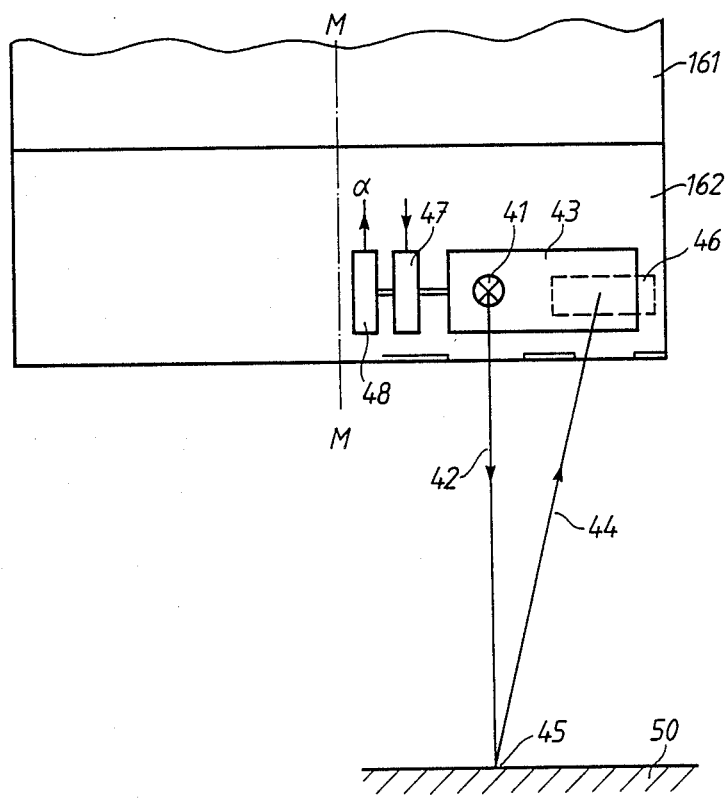
Figure 3C:
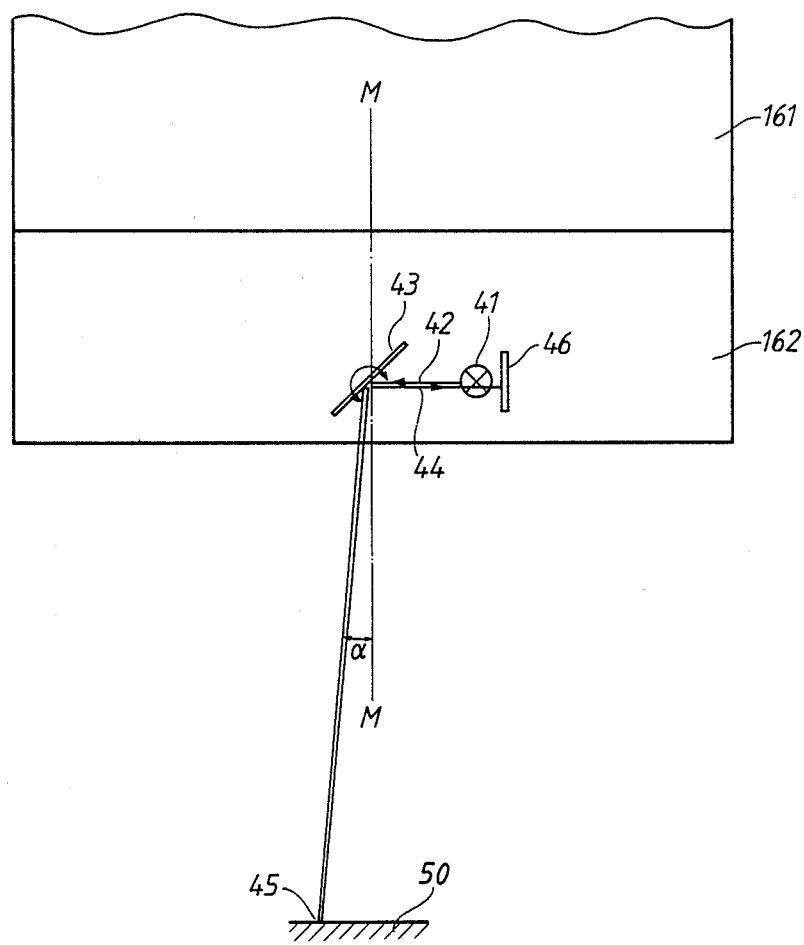

The sensor 16 has a housing 161 fixedly mounted on the robot hand 15 (see FIGS. 3A–3C). A sensor unit 162 is mounted below the housing 161. The unit 162 is in the form of a circular disc and is turnable in relation to the housing 161 around the approximately vertical axis M-M shown in FIG. 3B. The angle of rotation of the sensor unit 162 in relation to the axis y in the coordinate system of the robot hand 15 is designated c. The sensor unit 162 accommodates a light source 41, for example a pulsed LED emitting a light beam 42. The horizontally emitted light beam 42 is reflected in a rotatable mirror 43 in a direction downwards towards an object 50. An optical system (not shown) refracts the light to a small spot 45 on the surface of the object 50. The light beam 44 emitted from this spot, which constitutes the measuring point, is reflected by the mirror 43 to a detector 46, which may consist of a lateral photodiode. An optical system (not shown) refracts the light emitted from the measuring point to a point on the surface of the detector 46. If the distance between the object 50 and the sensor 16 is changed, the light beam 44 will hit the detector surface at different points and therefore, in a known manner, a signal can be obtained from the detector 46, which signal constitutes a measure of the point of impact of the light beam 44 on the detector surface and hence of the distance between the sensor 16 and the object 50. The mirror 43 is rotatable around an axis perpendicular to the axis M-M with the aid of a drive member 47, which periodically turns the mirror 43 back and forth around a central position, in which the emitted light beam 42 is parallel to the axis M-M. The angle between the so-called triangulation plane, which is determined by the beams 42 and 44, and a plane through the axis M-M is designated α. An angle transducer 48 is arranged on the axis of rotation of the mirror 43, from which a signal is obtained which constitutes a measure of the angle α at each moment.

Figure 3D:
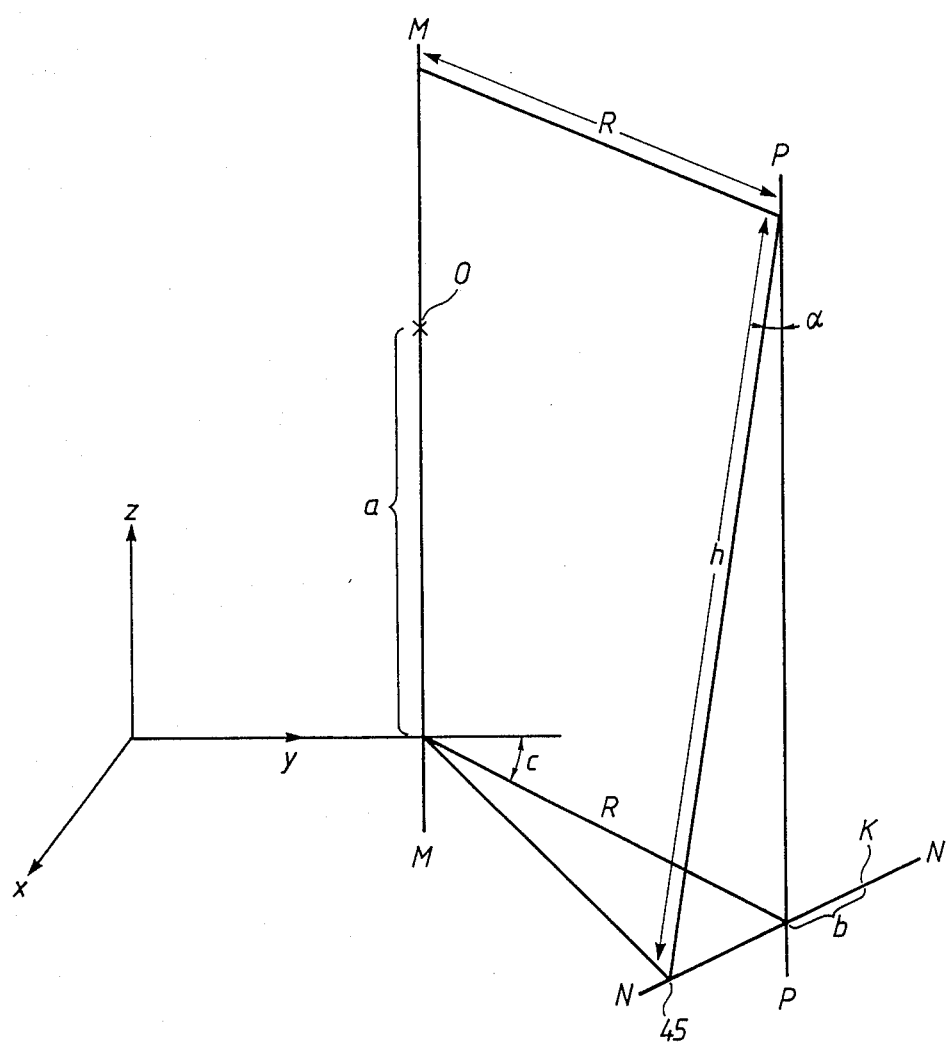
FIG. 3D shows the geometrical relationship between the different quantities occurring in the sensor.

FIG. 3D shows the relationship between the different measurement quantities of the sensor. The coordinate system of the robot hand is designated x, y, z. In FIG. 3D, R designates the radial distance between the axis M-M and the light source 41. The letter h designates the distance to the measuring point 45 measured by the sensor at a certain angle α deviating from the center position. The letter a designates the distance parallel to the axis M-M between an origin of coordinates O of the sensor and the measuring point 45. By the oscillating movement of the mirror 43, the measuring point 45 will be periodically swept back and forth in a plane defined by the lines N-N and P-P in FIG. 3D. The robot equipment is provided with means adapted, by suitable signal processing, to detect the occurrence of a distance discontinuity, for example a sheet edge, a weld joint, or the like, and to determine the position thereof along the line N-N in relation to the mid-point of the scan. In FIG. 3D the position of such a discontinuity is designated K, and the distance along the line N-N between the discontinuity and the mid-point of the scan is designated b. The angle c is the rotation of the sensor unit 162 relative to a direction parallel to the y-axis of the robot hand.

Figure 4:
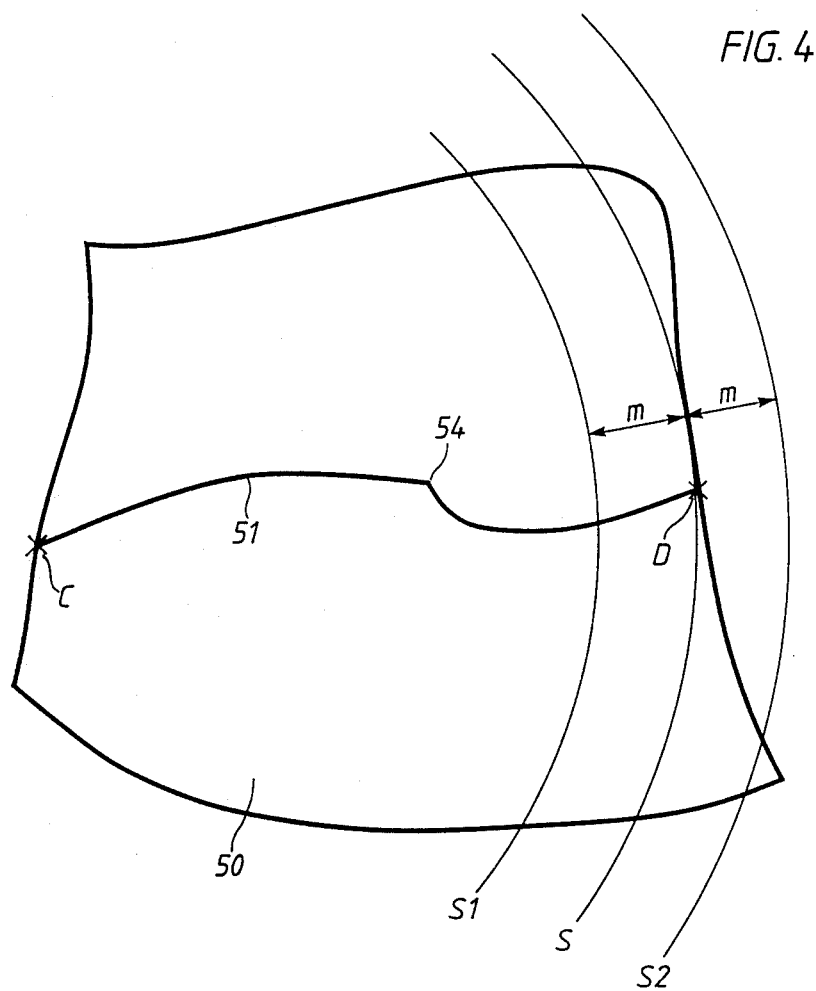
FIG. 4 shows an example of a workpiece and a working path.

FIG. 4 shows an arbitrary work object 50, which has a joint 51 which is to be welded by means of the robot equipment. The work object is typically one of a series of identical work objects. The work objects within the series may, however, deviate from each other with respect to the shape of the weld joint, the length of the weld joint, and the position and orientation of the work object. However, independently of such variations, the equipment according to the invention will always terminate the welding at point D, i.e. that point at which the weld joint 51 encounters the edge of the object shown on the righthand side in the Figure. In certain cases, it may be suitable, as shown in FIG. 4, to program a so-called stop zone around an expected stop point D. The stop zone may, for example, be defined by moving the welding torch to point D, the coordinates of which are stored. Thereafter, a quantity m is entered and stored, with the aid of which the control system defines two spherical shells S1 and S2 on either side of the point D and at a distance m from that point and with its center at point C. The control system is programmed in such a way that the welding operation is only terminated if the working point, when fulfilling the laid-down termination criterion, is located within the stop zone, i.e. in the volume between the two shells S1 and S2. This eliminates the risk of the welding being interrupted too early, for example owing to a sharp change of direction 54 of the weld joint located ahead of the stop zone. If such a risk is not present, the defining of and the taking into consideration of a stop zone can, of course, be omitted.

Figure 5A:
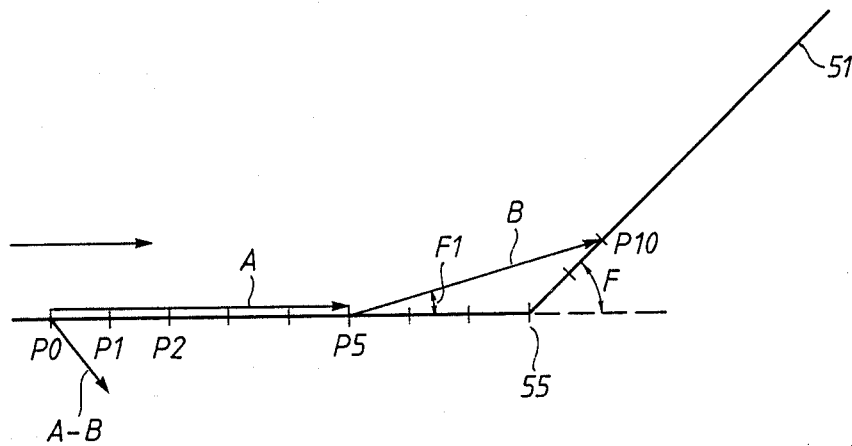
FIGS. 5A–5C show the principle of the function of that embodiment of the invention in which the sensed quantity consists of a change of direction of the working path.
Figure 5B:
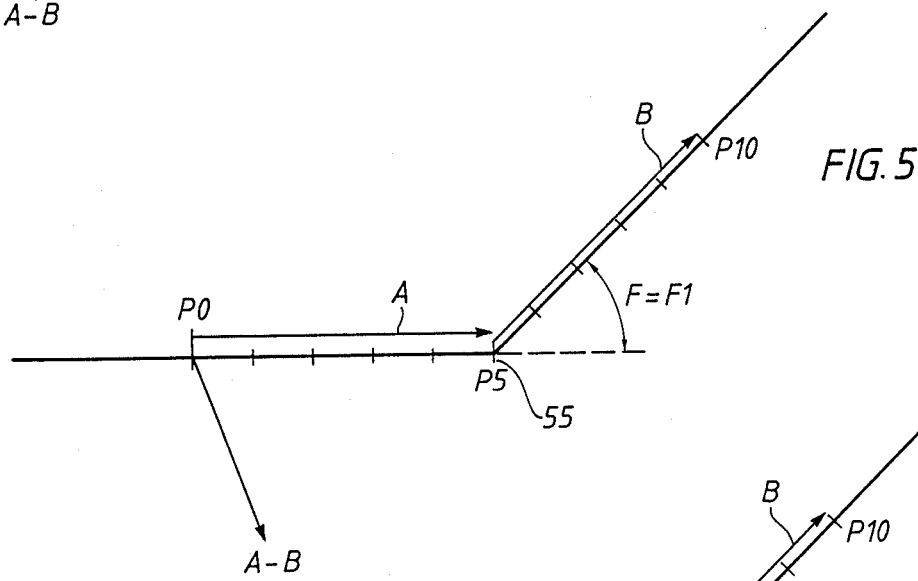
Figure 5C:
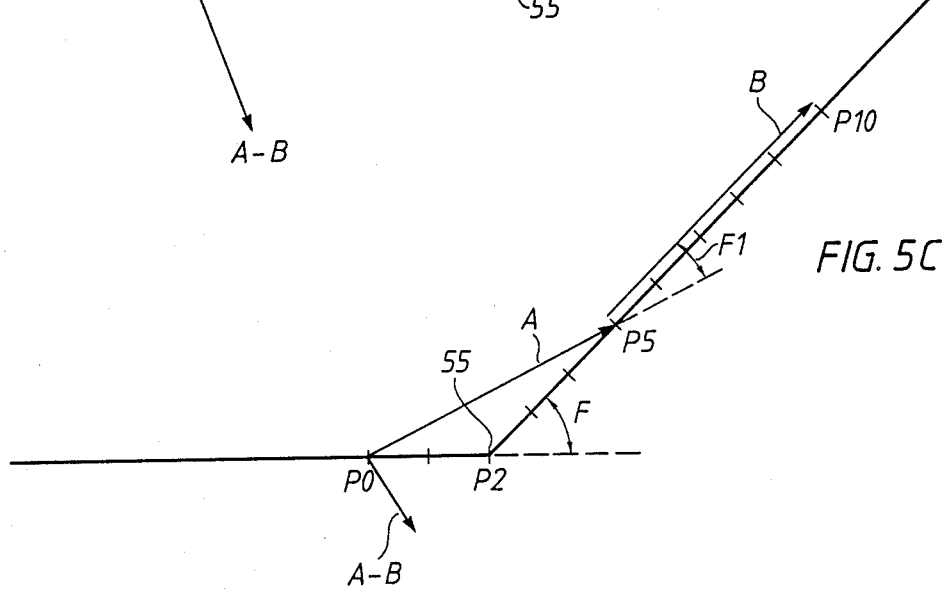

According to one embodiment of the invention, the weld joint is sensed continuously during the welding process whether it exhibits a corner or an angle. If this is the case, and if the change of direction of the path exceeds a predetermined value, this is considered to constitute a stop criterion and the welding process is interrupted when the welding torch has reached the corner. How this determination is made is illustrated in FIGS. 5A-5C. These show a weld joint 51 with a corner 55 in which the change of direction has the value F. During the welding, the sensor and the welding torch move to the right in the Figures. The turning of the sensor (angle c) is automatically set so that the weld joint will be located approximately in the middle of the sensor scan. At regular intervals, the coordinates for the position of the weld joint sensed by the sensor are transformed to the robot coordinate system and are temporarily stored therein. The robot is controlled such that the working point of the welding torch will move successively from one to the other of those points whose coordinate values have been stored. Typically, the sensor and the welding torch move at a constant velocity along the weld joint, and the stored points will therefore be approximately equidistant. The coordinates of the points may, for example, be stored in a memory of a so-called first in-first out type. Each time the coordinates for a new point are stored into the memory, the coordinates for the oldest of the previously stored points are erased therein. As an example, it has been assumed that the coordinates for the last 11 read points, P0-P10, are stored in the memory. In FIG. 5A, the welding process is assumed to have arrived at such a point that the point P10, last sensed by the sensor, is located immediately to the right of the corner 55 (point P8 coincides with corner 55). The welding torch can then be assumed to be located at point P0 or possibly a certain distance to the left of this point. During the welding process, the two vectors are continuously calculated, where $A = P5 - P0$ and $B = P10 - P5$, and where P0, P5 and P10 are those vectors which define the positions of the respective points. Further, the system forms the absolute value of the vector $|A-B|$, which vector is the difference between the vectors A and B. It can be shown in a simple manner that this absolute value is a measure of the angle F1 between the vectors A and B.

The absolute value of the vector $|A-B|$ increases all the time as the welding process moves to the right in the Figures and reaches its maximum when point P5 is located at corner 55, i.e. when the vectors A and B are equally long. This position is shown in FIG. 5B. After this, the absolute value of $|A-B|$ is decreased, as is clear from FIG. 5C, and the vector $|A-B|$ becomes zero when the point P0 has moved past the corner 55. It can further be shown in a simple manner that the maximum value of the absolute value of $|A-B|$ constitutes a measure of the change of direction F at corner 55.

Figure 6C:
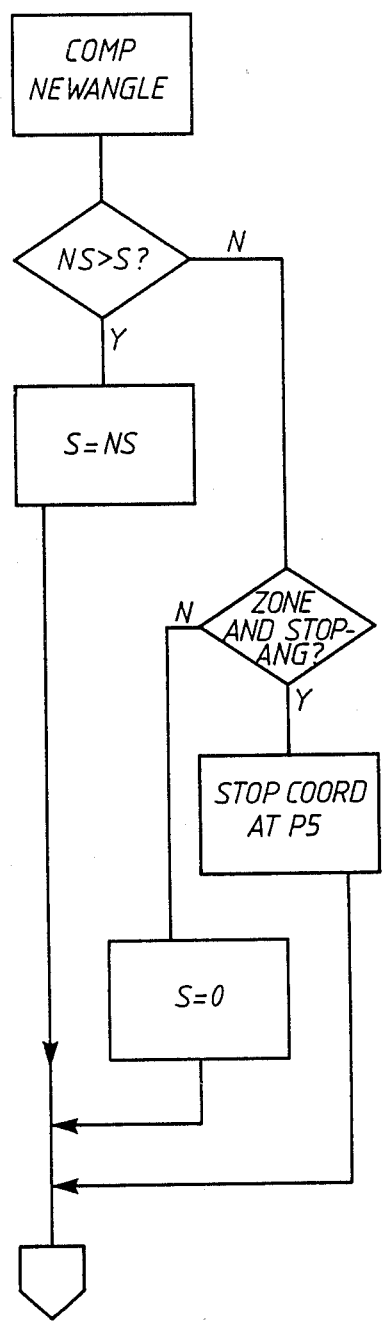

The necessary calculations are carried out by the computer 21 of the robot equipment, which is programmed according to the principle which is illustrated in the flow charts in FIGS. 6A-6C. The two procedures, PROC FIFOWRITE and PROC FIFOREAD, shown in FIG. 6A and FIG. 6B are executed simultaneously and in parallel. The first-mentioned procedure receives the position of the joint in sensor coordinates and transposes the joint position to the robot basic coordinate system X, Y, Z which is fixed in space. The coordinates of the joint are thereafter stored on a first in-first out stack. The procedure PROC ANGLE is used in order to calculate and detect, from the coordinates stored in the stack (the memory), a possible change of direction of the weld joint. The procedure starts by awaiting a start order (WAIT START) and is initiated when an order has been received from the control system to start the tracking and the welding process. The pre-stored values of stop angle and stop zone are thereby picked up, and the angle F1 (see FIGS. 5A-5C) is set at zero (INIT STOP, F1=0). In the next step, WAIT COORD, the procedure stands by, awaiting sensor coordinates from the sensor, or a stop order. If either of these two things is received, the procedure first senses whether a stop order exists (STOP?). If this is the case, the welding operation has been interrupted and the procedure returns to the initial position WAIT START. If instead sensor coordinates (a, b, c) have been received, these are transformed, TRANSFORM, to basic coordinates X, Y, Z. These basic coordinates define the last point sensed by the sensor along the weld joint and are written in, WRITE X, Y, Z, at the top of the above-mentioned stack. After this, the procedure PROC ANGLE is called (see FIG. 6C).

The procedure PROC FIFOREAD reads joint coordinates from the stack and supplies a movement order for the axis drives of the robot. In the first step of the procedure, WAIT START, the procedure stands by awaiting a start order. When the working procedure is started, the procedure proceeds to the next step, READ COORD, where a set of new coordinates are fetched from the stack. The welding torch may, for example, be assumed to be controlled towards the point P0, and it is then the coordinates for this point that are fetched from the stack and which in the next step, POSITION, are forwarded as positioning order to the axis control systems of the robot. In this way, the welding torch is brought to track the weld joint as the point P0 during the working procedure moves to the right in FIG. 5A along the joint. In the next step, STOP COORD?, it is sensed whether coordinate values which are forwarded to the axis control systems constitute the coordinates for a stop point. If this is not the case, the procedure returns to fetching the coordinates for the next point. On the other hand, if the last emitted coordinates constitute the coordinates for a stop point, a stop order (STOP) is delivered. This stop order interrupts the procedure PROC FIFOWRITE and thereby no new coordinates are written into the stack. The movement of the robot and the welding process are thus interrupted.

FIG. 6C shows the procedure PROC ANGLE. This procedure fetches the three sets of coordinates for the points P0, P5 and P10 from the stack. The coordinates are read from the stack with fixed offsets relative to the write-in pointer of the stack and the read-out items are equidistant. From the coordinate values of the three points, the magnitude and position of angles of the joint are determined. In the first step of the procedure, COMP NEWANGLE, a new value NS is calculated of that quantity S (the absolute value of vector $|A-B|$ which constitutes a measure of the angle F1 between vectors A and B. In the next step, NS>S?, it is sensed whether the calculated value is greater than the immediately preceding value. If this is the case, the value S=NS is set and the process returns to the procedure PROC FIFOWRITE. The process continues in this way for as long as the angle F1 is increasing. When the angle has reached its maximum, the condition NS>S in the second step of the procedure is no longer fulfilled. The procedure therefore proceeds to a step, ZONE AND STOPANG?, in which the system senses whether the corner 55, i.e. the position of point P5, is located within the stop zone (see FIG. 4), and also senses whether the detected maximum angle exceeds the prestored value of the stop angle. If this is not the case, S=0 is set and the procedure returns to PROC FIFO-WRITE. Thus, no stop order is given. On the other hand, if the point P5 is located within the stop zone, this point is marked as indicating a stop position, STOP COORD AT P5. The procedure then returns to PROC FIFOWRITE. As the robot moves along the weld joint and new values are fed into the stack, the point thus marked as a stop point will move downwards in the stack. When it has arrived at the bottom of the stack. i.e. when it constitutes the point P0 in FIG. 5C, PROC FIFOREAD discovers that this point is a stop coordinate, and the robot movement will be stopped when the point P0 and hence the welding torch reach the corner 55.

Figure 7:
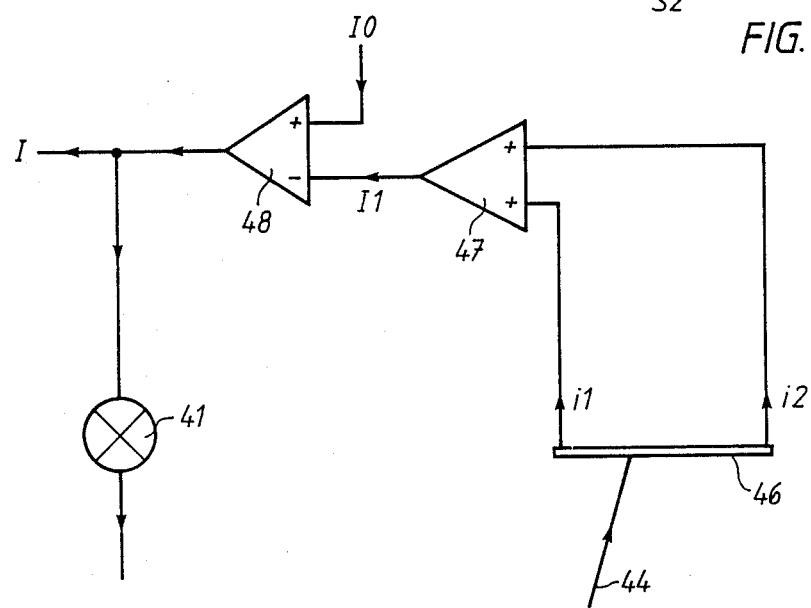

FIGS. 7-9 show another embodiment of equipment according to the invention in which the sensor 46 consists of a lateral photodiode. The difference between two photocurrents i1 and i2, taken out at the ends of the sensor, constitutes a measure of the position of the point along the detector at which the received light beam 44 hits it. How this difference is signal processed is known per se and is not shown in FIG. 7. According to the embodiment now described, however, the sum of the two photocurrents is formed in an amplifier 47. This sum is a measure of the intensity I1 of the received light. It is compared in a differential amplifier 48 with a reference value I0. The output signal from the amplifier 48 is supplied, possibly after an additional amplifier stage, as a drive signal to the light source 41. In this way a closed control loop is formed, which strives to keep the intensity of the received light constant and equal to the desired value I0. This latter value is chosen such that optimum operating conditions are obtained for the detector 46. The intensity I of the emitted light will thus be varied in dependence on the optical reflectivity of the object which reflects the light. The output signal from the amplifier 48 is a measure of I and hence of the reflectivity of the object.

Figure 8A:
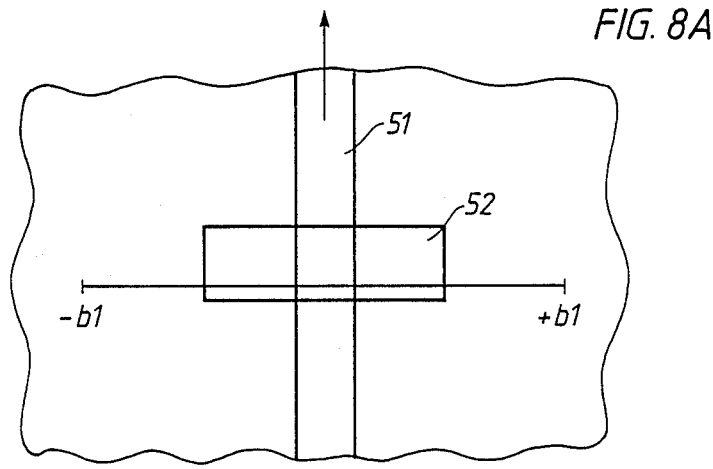
FIGS. 8A–8C and 9A–9C show the function of that alternative of the invention in which a change in the reflectivity of the workpiece is used to define the end point of the working path.
Figure 8B:
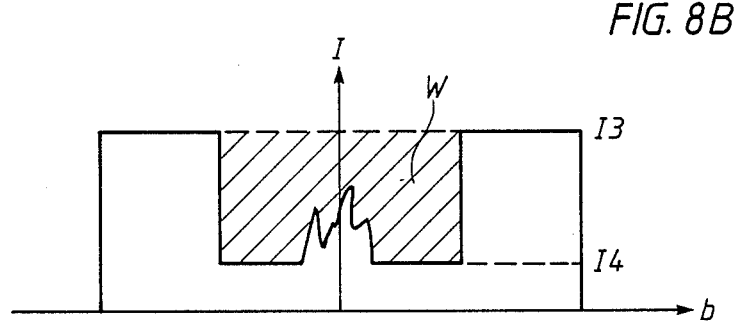
Figure 8C:
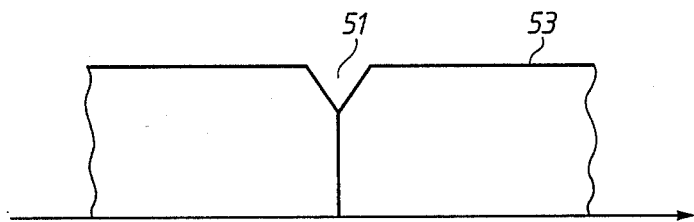

FIG. 8A shows a weld joint 51, a so-called fillet joint. The welding is assumed to move in the direction of the arrow. The end points of the sensor scan are designated +b1 and −b1, and the measuring point moves periodically back and forth between these points. At this point along the weld joint 51 where it is desired to terminate the welding, a region 52 with a higher optical reflectivity than the rest of the surface of the object has been applied. The region 52 may, for example, consist of a line drawn with chalk, a piece of light-colored adhesive tape, or the like. When during the movement along the weld joint, the scan arrives at the region 52, the intensity I, plotted against the scan coordinate b appears as shown in FIG. 8B. On either side of the region 52, I has a high value I3. Within the region 52, however, I has a lower value I4, apart from the passage across the actual weld joint where irregularities may appear. The signal I is supplied and analyzed by the control system of the robot equipment, which control system can be programmed in a simple manner to detect the occurrence of a region 52 with a reflectivity which is different from the surroundings. For example, the control system can calculate in dependence on the signals I and b, the area W of the hatched surface shown in FIG. 8B. The quantity W is compared with a reference value, and if W exceeds the reference value, the measuring scan is assumed to have reached a region 52 with a different reflectivity. To attain greater reliability in the detection, the quantity W can be calculated during two or more consecutive measuring scans, and a detection of a region 52 with a different reflectivity is assumed to be present only if W, at a given number of consecutive measuring scans, exceeds a limit value. FIG. 8C shows the geometrical appearance of the object with its surface 53 and the fillet joint 51.

Figure 9A:
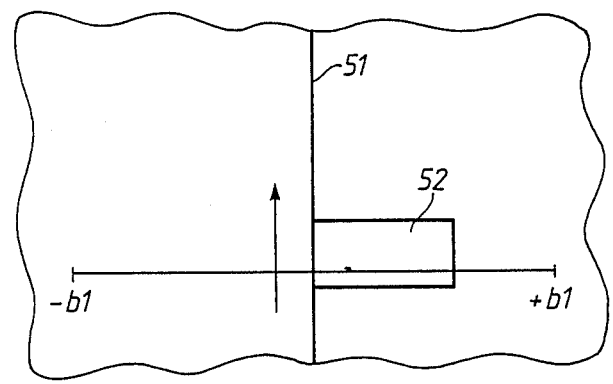
Figure 9B:
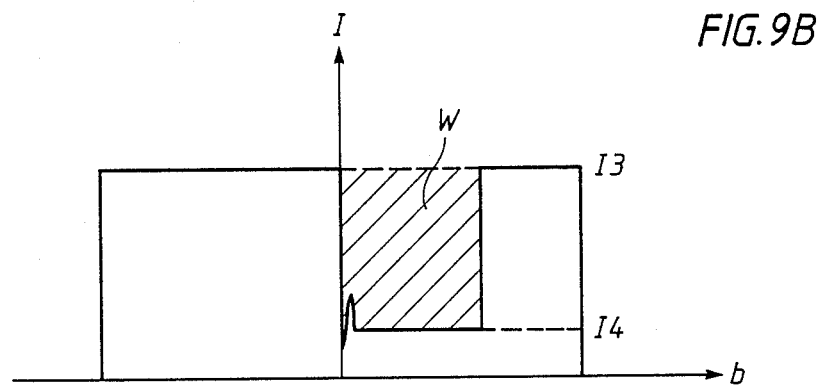
Figure 9C:
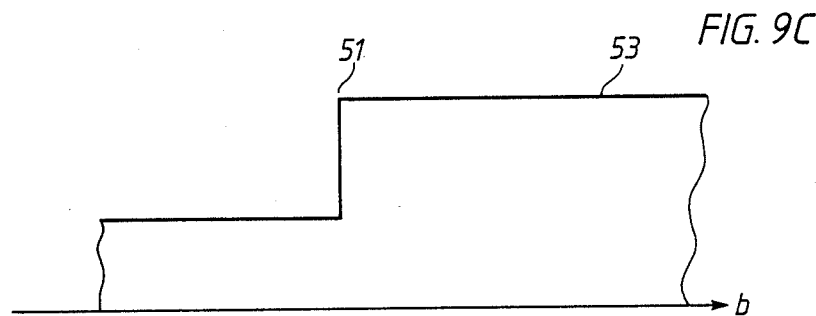

FIG. 9A shows how, as an alternative, a region 52 with a different reflectivity can be arranged on one side of a weld joint 51 only. In the manner just described, the detection of the region 52, for example, can take place by calculating the quantity W (see FIG. 9B) during one or more consecutive measuring scans. FIG. 9C shows the geometrical appearance of the surface 53 of the work object. The weld joint 51 in this example consists of a so-called overlap joint.

The control system can be adapted to detect, in a simple manner, whether, according to FIG. 8A, the region 52 is located on both sides of the weld joint or if, according to FIG. 9A, the region 52 is applied on one side of the weld joint only. By applying the region 52 on one side of the weld joint only, according to FIG. 9A, additional information can be supplied to the control system. The control system may, for example, when discovering such a one-sided mark, be programmed to interrupt the working procedure and to rotate the sensor, for example, 90° in the direction indicated by the mark 52, whereupon a new working procedure can be started.

Marks according to FIGS. 8A and 9A can also be given other functions. For example, a position which is to be skipped along a weld joint can be marked by two markers, one on each side of the location. The control system is thereby programmed to interrupt the working procedure when detecting the first marker, to continue the tracking along the weld joint until the second marker is detected, whereupon the working procedure is resumed during continued tracking.

In the foregoing, robot equipment according to the invention adapted to electric arc welding has been described. However, as mentioned above, many other applications are feasible, for example applying strings or strands of an adhesive or sealing compound. Similarly, sensors of a type different from those described can be used in equipment according to the invention. In applications other than electric welding, the work tool supported by the robot hand will, of course, consist of a tool other than an electric welding torch, for example a glue sprayer, strand applicator or the like. The work operation carried out by means of the robot equipment need not be a work operation in a traditional sense, but may, for example, consist of measurement or inspection along an edge, a joint, or the like, the work tool then constituting a means for measuring or inspection. To cover such possibilities the term "operating member" has been used in the following claims.

What is claimed is:

1. Industrial robot equipment comprising:

an industrial robot having a robot hand onto which is mounted an operating member for carrying out an operation on an object, the robot being provided with a sensor for control of the operating member along a path along the object while the operating member is carrying out a required operation, wherein the equipment includes:

means for defining a stop zone prior to commencing the required operation;

means for sensing, during the required operation, whether the path changes direction and for determining a magnitude for the on-going change in direction;

means for determining the position of a sudden change in direction of the path; and means for interrupting the movement of the robot hand along the path during the operation if the robot hand is located within the pre-defined stop zone, the magnitude of the on-going change in direction exceeds a predetermined value and the operating member has reached the sudden change in direction of the path.

2. Industrial robot equipment according to claim 1, further comprising:

means for continuously determining respective positions of first, second and third points of the robot hand along the path;

means for forming from said three points a first vector which indicates the direction between the first and second points and a second vector which indicates the direction between the second and third points;

means for calculating a quantity which is a measure of the angle between the vectors;

means for investigating when, upon a change in direction of the path, the quantity reaches a maximum value corresponding to the magnitude for the on-going change in direction; and means for storing the position of the second point when the quantity has the maximum value.

* * * * *